(12) United States Patent
Guymon et al.

(10) Patent No.: US 12,297,389 B2
(45) Date of Patent: May 13, 2025

(54) PLASTIC PYROLYSIS REACTOR

(71) Applicant: LUMMUS TECHNOLOGY LLC, Houston, TX (US)

(72) Inventors: David Lee Guymon, Houston, TX (US); Daniel T. Fernald, Houston, TX (US); Ron Herbanek, Houston, TX (US); Richard John Jibb, Houston, TX (US); Sudipto Chakraborty, Houston, TX (US); Johnny Doyle Combs, Tyler, TX (US); Boddie Lynn Lindsey, Kilgore, TX (US); Zachary Alan Mays, Houston, TX (US)

(73) Assignee: Lummus Technology LLC, Houston, TX (US)

( * ) Notice: Subject to any disclaimer, the term of this patent is extended or adjusted under 35 U.S.C. 154(b) by 0 days.

(21) Appl. No.: 18/154,055

(22) Filed: Jan. 13, 2023

(65) Prior Publication Data
US 2023/0227729 A1    Jul. 20, 2023

Related U.S. Application Data

(60) Provisional application No. 63/266,801, filed on Jan. 14, 2022.

(51) Int. Cl.
| | |
|---|---|
| *C10B 47/18* | (2006.01) |
| *C10B 31/02* | (2006.01) |
| *C10B 43/04* | (2006.01) |
| *C10B 47/34* | (2006.01) |
| *C10B 53/07* | (2006.01) |
| *C10G 1/10* | (2006.01) |

(52) U.S. Cl.
CPC .............. *C10B 47/18* (2013.01); *C10B 31/02* (2013.01); *C10B 43/04* (2013.01); *C10B 47/34* (2013.01); *C10B 53/07* (2013.01); *C10G 1/10* (2013.01); *C10G 2300/1003* (2013.01)

(58) Field of Classification Search
CPC ................................................ B01D 1/22–228
See application file for complete search history.

(56) References Cited

U.S. PATENT DOCUMENTS 2,542,269 A * 2/1951 Zahm ..................... B01D 1/225
                                                                    159/25.2
2,774,415 A * 12/1956 Belcher .................. B01D 1/225
                                                                    159/25.1
(Continued)

FOREIGN PATENT DOCUMENTS

| CN | 2422285 Y | 3/2001 |
|---|---|---|
| CN | 2550368 Y | 5/2003 |

(Continued)

OTHER PUBLICATIONS

PE2E translation of CN 101712770.*
(Continued)

*Primary Examiner* — Jonathan Luke Pilcher
(74) *Attorney, Agent, or Firm* — Osha Bergman Watanabe & Burton LLP

(57) ABSTRACT

A system for converting waste plastic material to petrochemicals. The system including a feed inlet and distributor zone, a raked film reaction section located below the feed inlet and distributor zone, and a stirred tank reaction section located below the raked film reaction section.

21 Claims, 2 Drawing Sheets

(56) References Cited

U.S. PATENT DOCUMENTS

| | | | |
|---|---|---|---|
| 3,067,812 A * | 12/1962 | Latinen | B01D 19/0026 210/179 |
| 3,228,453 A * | 1/1966 | Hans | B01D 1/225 202/236 |
| 3,395,419 A * | 8/1968 | Nunlist | B01D 1/225 159/6.2 |
| 5,411,714 A * | 5/1995 | Wu | C10B 53/07 110/255 |
| 7,691,344 B2 * | 4/2010 | Yoshimura | F23G 7/12 422/198 |
| 7,883,605 B2 | 2/2011 | Grispin | |
| 8,728,282 B2 | 5/2014 | Niu | |
| 9,321,964 B2 | 4/2016 | Lepez et al. | |
| 9,920,255 B2 | 3/2018 | Hofer | |
| 10,131,847 B2 | 11/2018 | McNamara | |
| 10,208,253 B2 | 2/2019 | McNamara et al. | |
| 10,421,911 B2 | 9/2019 | Ullom | |
| 10,731,081 B2 | 8/2020 | Ullom | |
| 2018/0355256 A1 | 12/2018 | Dooley | |

FOREIGN PATENT DOCUMENTS

| | | |
|---|---|---|
| CN | 101712770 A | 5/2010 |
| CN | 112080297 A | 12/2020 |
| WO | 2008-017953 A2 | 2/2008 |

OTHER PUBLICATIONS

International Search Report issued in International Application No. PCT/US2023/060633, mailed on May 12, 2023 (4 pages).

Written Opinion issued in International Application No. PCT/US2023/060633, mailed on May 12, 2023 (5 pages).

* cited by examiner

PLASTIC PYROLYSIS REACTOR

FIELD OF THE DISCLOSURE

Embodiments of the present disclosure generally relate to a reactor for the conversion of waste plastics to petrochemicals.

BACKGROUND

There has been a rapid and growing environmental concern regarding the need to recover and recycle plastic wastes.

Pyrolysis refers to the dissociation or decomposition of chemical compounds by heat and, in particular, is a process that has been described whereby long molecules are converted to liquid fuel by thermal degradation (cracking) in the absence of oxygen. During pyrolysis of plastic waste, for example, the plastic waste is typically first made molten within a chamber under an inert environment. The molten material is then heated and reacted to form lighter molecules, some of which may be in a gaseous state.

Pyrolysis of plastics is often performed in a batch process, where the batch is brought up to a single set point temperature, or provided with a constant heat input rate, until reaction of the batch is complete. Other processes step the feed through a series of heating zones, also with defined set temperatures and residence times per zone.

For example, U.S. Pat. No. 7,883,605 describes a process for pyrolyzing hydrocarbonaceous material whereby the heat rate is defined based on the reactor charge in a range 0.25 to 27 kW/kg.

In a semi-batch process, U.S. Ser. No. 10/421,911 (Alterra) describes an extruder section (with at least three zones) and a multi zone kiln reactor (with at least two zones) including a zone for (further) destabilization and dehalogenating and a zone for pyrolyzing and devolatilizing pyrolyzed hydrocarbonaceous materials.

Following pyrolysis, the hot pyrolytic gases are then condensed in one or more condensers to yield a hydrocarbon distillate comprising straight and branched chain aliphatics, cyclic aliphatics and aromatic hydrocarbons. Conventionally, the resulting mixture is roughly equivalent to regular diesel fuel after the placement of additives and the implementation of other minor downstream processing actions.

Typically, the pyrolysis systems use two pyrolysis chambers which work together at an approximately equal rate. Of particular issue with the setup of existing pyrolysis chambers is that fuel may only be produced in a batch type basis. Once both chambers complete the pyrolysis of waste material in unison, it is necessary to wait for each to cool before unwanted carbonaceous char can be removed from the inside of each chamber. It is therefore presently necessary to wait for each chamber to cool and be hand cleaned of char before the chambers can be used again for second and subsequent batches.

Horizontal, or slightly inclined, screw conveyors have been used previously for transportation and heating/cooling of a solid feedstock material. For example, U.S. Pat. Nos. 9,321,964, 10,731,081, 8,728,282 and US Patent App. Publication No. 2018/0355256 disclose different types of horizontal or slightly inclined screw conveyor or kiln type systems. These systems primarily use the rotor as a conveying device to move the material through the furnace. These references also have various vapor withdrawal systems but have a common feature that the vapor is withdrawn from the kiln either continuously along the length or at the kiln outlet.

Besides using a screw conveyor to move material through a kiln, other references disclose batch or semi-batch processes using a stirred tank reactor (STR). For example, U.S. Pat. Nos. 10,131,847, 10,208,253, and 9,920,255 describe batch or semi-batch systems which use a STR for pyrolysis of plastic waste. U.S. Pat. No. 9,920,255 notes that heat transfer in a stirred tank is limited by the low thermal conductivity and high viscosity of the molten plastic. To overcome this limitation, it was necessary to dilute the plastic melt with a large quantity (>50%) of heavy oil from a fossil source.

Of further issue with existing pyrolysis systems are higher frequency clean out times of chambers, poor heat transfer within the waste feedstock itself increasing process time per charge and also the expense and fouling of consumable catalysts. The final issue is the quality of the final fuel product including a measure of diesel fuel's ability to reduce wear on contacting solid surfaces found in some fuel pumps and injectors.

In view of the above, an object of the present invention is to provide a pyrolysis reactor that has an increased throughput of hydrocarbons that are of consistent quality, using waste plastic stockfeed.

SUMMARY

One or more embodiments disclosed herein are related to a system for converting waste plastic material to petrochemicals. The system includes a feed inlet and distributor zone, a raked film reaction section located below the feed inlet and distributor zone, and a stirred tank reaction section located below the raked film reaction section.

Other embodiments disclosed herein are related to a system for converting waste plastic material to petrochemicals. The system includes a feed inlet and distributor zone, and a stirred tank reaction section located below the feed inlet and distributor zone.

DETAILED DESCRIPTION

Figure 1:
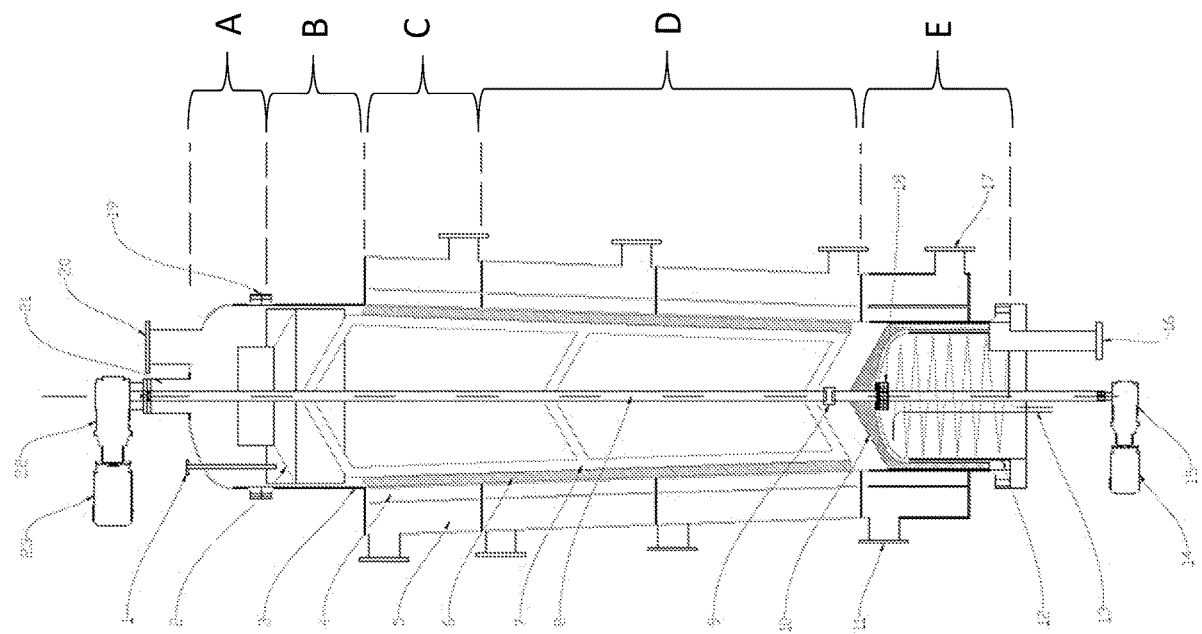
FIG. 1 illustrates a reactor design of a system according to one or more embodiments disclosed herein.

Embodiments herein are directed towards one or more pyrolysis reactor designs for thermochemical processes to convert waste plastics to useful petrochemicals and other intermediates or end products.

Embodiments herein relate to pyrolysis reactors that may convert waste plastic into useful oils, gasses, and pitch. The oils can be used to make fuels, blended with fuels, or used to produce other hydrocarbon products. The reactor may be a modular system that includes melt processing (using a primary melt tank and an extruder) to preheat a solid mixed plastic waste and remove contaminants such as chlorides, as well as a post reaction separation system to separate the reactor effluent into useful product streams. The reactor may have a high throughput and operate in a continuous mode by virtue of a high heat transfer rate which provides for most of the conversion from plastics to pyrolysis products. The management of the residue is facilitated by using a stirred tanked reactor (STR) section for further conversion and to potentially generate an additional useful product that may be used, in some embodiments, as an additive to asphalt.

Generally, a vertically oriented, heated, jacketed pressure vessel reactor may be used in one or more embodiments. Heating sources include flue gas heating, electrical heating, or a combination of flue gas and electric heating. This type of reactor may utilize an internal, axially oriented, rotating assembly to both act as a feed distributor and film raking device. Feed may be diverted to form a film on the internal wall of the vessel where a rotating rake agitates the film to set its average travel speed, or, restated, to control the average residence time of the fluid within the reactor, thereby increasing heat transfer, and maintaining cleanliness of the heating surface. Vapor and gas exit the film toward the center of the vessel where they rise and exit the top of the vessel. A liquid level is maintained at the bottom of the vessel to complete the conversion to vapor/gas, and a liquid pitch may be collected and extracted from the bottom to produce a heavy residue product. The produced vapors and gas may be sent to a distillation process for separation into one or more product streams.

In contrast to previous designs, one or more embodiments disclosed herein may use a rotating rake device to mix the fluid as it flows vertically down, under gravity, along a heated inner surface of a reactor vessel. The rake is close enough to the wall that it will continually remove coke/ash deposits, and the entire inner surface of the reaction vessel is wetted with molten plastic. The heat transfer resistance of the thin film of molten plastic may be exceptionally low, especially compared to large quantities of solid or liquid material in the prior art. The heat transfer resistance may be further reduced by the action of the rotor.

As the vapor product exits from the top of the reactor in counter-current flow to the falling molten plastic films, vapor generated at the bottom of the reactor will exchange heat with the cooling molten plastic moving down the reactor. In effect, the rising vapor heats the falling molting plastic in a continuous fashion. The exchange of heat and mass of the generated vapor due to pyrolysis of plastic creates an internal recycle which increases the amount of light oil produced compared to only gaseous product and heavy oil components of the prior art.

In contrast to batch type systems, one or more embodiments disclosed uses a raked film reactor (RFR) section with a lower temperature, such as about 420-490° C. and short residence time, such as 2-10 minutes, followed by a STR section at slightly higher temperature, such as about 440-490° C. and longer residence time, such as 20-60 mins. The RFR section rapidly preheats the reaction melt to the pyrolysis temperature and may be able to convert 30-80% of the polymer to pyrolysis products. The remaining unreacted material together with any material that has recondensed and recycled from the vapor phase is fed to the STR section. The material in the STR section may be converted more slowly.

In one or more embodiments, using either reactor type, a heating jacket may be used in between the reactor inner wall and an outer cylindrical housing connected to one or more hot flue gas pathways along the height of the STR. The outer housing may be divided into different zones to enable the heat rate to each zone to be adjusted to suit different feed properties. In one or more embodiments, the heating jacket may use a molten metal between the reactor inner wall and an outer cylindrical housing. The high heat capacity of the molten metal may ensure that the plastic film is evenly and continuously heated within each zone.

Accordingly, one or more embodiments disclosed will now be described generally, with specifics of the reactor system described below. In one or more embodiments, the thermal pyrolysis reactor may generally be a vertically oriented jacketed pressure vessel. At the top, molten plastic feed enters the reactor via a feed tube at a feed temperature and flow rate. The liquid feed flows vertically down into a rotating distributor device that evenly distributes the liquid to form a 360-degree thin film on the internal side shell of the reactor vessel.

Gravity will drive the flow of material down the sides of the vessel. The heated jacket(s) outside the pressure shell provide the thermal energy for heating and for the reaction of the liquid feed. As the molten plastic flows down the walls, it reduces in viscosity. The pyrolysis process forms a hard residue that forms on the walls that, if left unmitigated, inhibits heat transfer. A rotating rake assembly with elements that continuously agitate/rake the fluid on the interior surface rotates about the center of the reactor. The rotor shaft turns both an upper distributor as well as the array of rake support arms. The RPM of the rotor is adjusted to control or set the average residence time (average vertical travel speed) of the fluid film flowing down the wall. The raking action may also increase the heat transfer from the wall to the fluid.

The raking action also reduces the accumulation of thick or hard scaling on the walls, increasing the time between cleaning or maintenance cycles and maintaining consistent thermal performance.

Vapor and gas produced by the reaction exit the reactor through a duct in the distributor assembly, and out of a nozzle located at the top of the reactor vessel. As the vapor travels upward, some of the vapor may recondense are be diverted back to the heated walls and mixed into the falling film. This internal reflux effect may increase the amount of product produced, and reduce the amount of waste char.

The bottom segment of the vertical pressure vessel reactor collects a liquid level of nearly fully reacted hot molten plastic/oil. This liquid is a blend of reacted heavy oil, plastic, ash, and other organic material that did not achieve volatilization and transition to vapor/gas phase. Heat is continually added to the liquid by a heat source at the reactor wall, and other surfaces on a bottom inverted head. A lower agitator, such as an agitator with a proximity style impeller may be used to keep the liquid in this section mixed at the wall to promote heat transfer whilst allowing denser material to drain under gravity. By controlling the heating and residence time of the reaction, this system may avoid the production of a dry char, which is a waste product.

An illustration of a reactor design according to embodiments herein is illustrated in FIG. 1. One or more feed inlet pipes 1 may introduce a molten plastic feed material through the overhead vapor space in zone A and deliver fresh molten plastic into a liquid level pool on the distributor 2. Each inlet feed pipe 1 may also serve to disengage entrained vapor or gas from upstream heating processes, resulting in the vapor or gas remaining in the overhead vapor space without traversing down into the main body of the reactor.

The distributor 2 may take a form from any known distributor arrangement and may be rotating along with the rotor assembly or static. For example, the distributor 2 may be fixed to the rotating rotor assembly and be equipped with a weir. The distributor 2 may hold a liquid at a level that is high enough such that the feed pipe 1 delivers the feed below a top level of the liquid such that the vapor and gas traveling up the reactor cannot enter the feed tube 1. As the distributor 2 rotates, the molten, liquid plastic held by the weir may flow over a perimeter edge and form a film of liquid plastic on the internal shell surface of the reactor shell 3. The overall diameter of the distributor 2 may be just smaller than the interior diameter of the reactor shell 3. Such a narrow diameter difference may allow for a uniform, and continuous film layer to form on the reactor shell 3 interior wall. In some embodiments, the distributor 2 equipped with a weir may include one or more notches (not illustrated) along a top or perimeter edge of the weir to help control a flow of the molten liquid plastic onto the internal shell surface of the reactor shell 3. The distributor 2 may also be equipped with an opening in the center of the distributor that directs vapors and gasses from the reaction space below into the overhead vapor space without contacting the molten, liquid plastic held in the distributor 2 by the weir. This arrangement may allow for the constant removal of produced vapor from the system through reactor outlet 20.

In the upper portions of the reactor vessel (zones A and B, together referred to as a "feed inlet and distributor section") which contain the feed tube 1, distributor 2, the reactor shell is not actively heated by one or more heating jackets. Instead, zones A and B may only be insulated to limit thermal energy loss. In the remaining zones C, D, and E, the reactor shell 3 may act as the heat transfer surface delivering the energy necessary to heat and convert the plastic feed into pyrolysis-oil, vapor, and gas. As referred to herein, zones C and D may be referred to as a "raked film reaction section" and zone E may be referred to as a "stirred tank reaction section."

Accordingly, zones C, D, and E may be equipped with a heat conduction jacket 4 which is external to the vessel and attached to the outside of the reactor shell 3. The heat source may be divided between one or more heating zones, and the heat source may be a flue gas jacket, or an electrical resistance heating source (electrical heating elements). A combination of electrical heating elements and flue gas jackets may also be used. In some embodiments, a first heating zone including heating elements and a second heating zone including flue gas jackets may be used. In other embodiments, only the first heating zone or second heating zone may be used. In the embodiment shown in FIG. 1, this heat conduction jacket 4 may be in thermal contact with, and receive heat from, one or more flue gas jackets 5. The heat conduction jacket 4 spreads the heat out across the reactor shell 3. Zones C, D, and E may have one or more flue gas jackets 5. Each flue gas jacket 5 may provide different levels of heating duty to each section. In such a fashion, a specific target temperature within each section may be independently achieved by heat transfer from a flowing gas phase heat source, such as waste heat from a flue gas, to the heat conduction jacket 4. A temperature gradient exists between the inlet and outlet for this annulus space, the heat conduction jacket 4 may spread out that heat energy such that the reactor shell 3 is less affected by this gradient and even heating within each zone may be achieved.

Each section of the flue gas jacket 5 may be equipped with a hot flue gas inlet 17 and a flue gas outlet 11. As the flue gas enters the hot flue gas inlet 17, the flue gas comes into contact with an outer surface of the reactor shell 3. The heat is then conducted to the heat conduction jacket 4, as described previously, to provide heat to the reactor vessel interior. Each of the hot gas jackets 5 may be fed from the same flue gas source, or from different flue gas sources, depending on the heat duty required in each zone. In either embodiment, the amount of flue gas entering each flue gas jacket 5 may be controlled by opening or closing a valve (not illustrated) or adjusting the speed of a blower (not illustrated). By controlling the amount of flue gas entering a given flue gas jacket 5, the amount of heating within each zone C, D, and E may be controlled.

The flue gas in the flue gas jackets 5 may be from the combustion of natural gas, produced gas from the process, or both. Initially, natural gas may be used to start the process. The natural gas may be fed to a burner for combustion. After a time, non-condensable gas produced by the plastic pyrolysis process may be used as the combustion gas. When sufficient supply is available, the natural gas stream may be shut off and the produced gas will be fed to the burner for combustion to heat the system. The burners are fed air to complete the combustion reaction via a blower.

While described above with respect to use of a heat conduction jacket, embodiments herein additionally contemplate heating of the interior surface of the reactor directly via the flue gas jackets or radiant energy from the electrical heating elements, or a combination thereof. For example, a reactor having a shell of sufficient thickness and conductivity (heat capacity) may be capable of receiving and evenly dispersing the heat from the flue gas or electrical heating elements to the molten polymer, negating the need for the intermediate heat conduction jacket. Accordingly, reactors according to embodiments herein may include one or more heating zones located around an outer surface of one or each of the raked film reaction section and stirred tank reaction section. The one or more heating zones in such embodiments are configured to provide heat to the respective raked film reaction section or stirred tank reaction section, and the heat may be provided by electrical heating elements, flue gas jackets, or a combination thereof.

The internal sections of zones C and D may be equipped with a rake 6. The rake 6 may be fixed to a rotating rake arm 7 as part of the rotor assembly that rotates with the distributor 2 by rotor shaft 8. The rake 6 may provide mechanical scraping of the flowing material on the reactor shell 3 inner wall to prevent build-up of charred material on the reactor shell wall. In this way, the rotating rake 6 agitates the falling film, or liquid material, allowing the heat conduction jacket 4 to provide a consistent heating surface. The rakes should be very close to the wall or touching the wall. In the case where the rakes are touching the wall, in order to keep the rakes into contact with the reactor shell 3 inner wall, the rakes may be provided with one or more springs or may be braced against the wall such that the rake itself acts as a spring. The springs may maintain the raking or scraping action on the wall in the event that minor variations in film thickness exist.

The reactor vessel may be equipped with a rotor shaft 8 and one or more rake arms 7, each having a rake disposed on the distal end of the rake arms, which collectively make up the rotating rake 6. The rotor shaft 8 is located at the center axis of the reactor vessel and is vertically oriented. The rake arms 7 are fixed to the rotor shaft 8 such that they form a fixed structural member. The rake arms 7 may be fixed to the rotor shaft 8 through any known method, including, but not limited to, casts, welds, flanges, or bolts. While illustrated with three rake arms 7, the rake 6 may be equipped with any number of rake arms 7 depending on the reactor design. Further, the geometry of the rake arms 7 may be altered to provide for a specific thickness of film on the vessel wall, as well as to follow the angle of the reactor vessel wall. The distributor 2 may also be fixed to the rotor shaft 8 such that as the rake 6 rotates, the distributor 2 rotates at the same speed.

The top of the rotor shaft 8 passes through a shaft seal and bearing assembly 21 and is coupled to a gearbox 22. The rotor shaft 8 receives a driving torque from the rotor gearbox 22 which receives input from rotor motor 23. The rotor motor 23 may any known type of motor. In one or more embodiments, the rotor motor may be a variable frequency drive motor which is capable of providing the necessary rotational speed torque, as well as torque feedback, for operation of the raked film section (zones C and D) of the reactor. The lower end of the rotor shaft 8 may be radially stabilized and supported by an agitator 10 through a rotor/agitator axial coupling 9.

The reactor vessel may also be equipped with a top head body flange 19 located between zones A and B, at a height proximate the distributor. When the rotor/axial coupling 9 is disengaged (uncoupled), the top heat body flange 19 may allow for an overhead crane to lift the entire rotor assembly (including rotor motor 23, rotor gearbox 22, rotor shaft seal and bearing assembly 21, rotor shaft 8, rakes arms 7, and rake 6) out of the reactor shell.

The rotor motor 23, through rotor gearbox 22 and rotor shaft seal and bearing assembly 21, may also provide for a varied rake speed, which may be controlled based on the amount of solid material fed to the reactor vessel, the type of material, the amount of char build-up on the interior wall, and the amount of heating required. Further, by varying the rake speed and the quantity and geometry of rake arms 7, the residence time of the material in zones C and D may be adjusted to achieve a high conversion of material.

The rotor/agitator axial coupling 9 may be fixed rigidly to either the rotor shaft 8 or the agitator 10, but not rigidly fixed to both. By not being rigidly connected to both the rotor shaft 8 and the agitator 10, the rotor/agitator axial coupling 9 allows the rotor shaft 8 and agitator 10 to operate at different rotational speeds, rotational directions, or both.

In other embodiments, only a single motor and gearbox may be provided, such as rotor motor 23 and gearbox 22. In such embodiments, the rotor shaft 8 may be coupled to both rake arms 7 and agitator 10. The gearbox and motor may thus be configured to supply a rotational torque to rotate the rake arms and agitator at the same speed and in the same direction. While capital and operating expense for the additional motor and gearbox may be saved, the ability to separately control the mixing and residence times within the reaction zones may be sacrificed.

The agitator 10 interacts with the liquid volume that resides in zone E, also called a stirred tank section, of the reactor. The agitation may help keep the liquid from cooling and solidifying within the lower portion of the reactor vessel. The agitation may be provided by an agitator motor 14 and an agitator gearbox 15. The agitator motor 14 may be one of any known type of motor, such as a variable frequency drive motor, that can provide the necessary rotational speed, and torque, as well as torque feedback for optimal operation of the agitator.

The reactor vessel may also be equipped with a bottom head assembly 12. The diameter and height of the bottom heat assembly 12 can be optimized to control the ratio of available heated surface area to liquid volume zone E. In one or more embodiments, the heat source for the bottom head assembly may be flue gas (such as the flue gas used in the one or more flue gas jackets 5), a different circulating hot fluid, or electrical heating elements. The entire bottom head assembly 12 may be a modular sub-system that includes the agitator 10, agitator seal and bearing assembly 18, agitator motor 14, and agitator gearbox 15.

The bottom head assembly may also include a heating coil 13 and a pitch auger 16. The heating coil 13 may supply any supplemental heat necessary for the continued reaction in the liquid phase in zone E. The separate heating coil 13 provides for independent heating within the bottom head assembly 12, separate from the heat source in the flue gas jacket 5 in zone E, and the flue gas jackets 5 in zones C and D.

Pitch forms in zones C, D, and E as debris, char, ash, and other remnant products that are not volatilized to gas or vapor during breakdown of the plastic feed material. The pitch auger 16 is configured to remove this pitch from the reactor by rotating a removing the solid material from the bottom portion of the bottom head assembly. The speed at which the pitch auger 16 rotates will prescribe how much pitch is removed, and may be a function of the particular feedstock to the reactor vessel and the feedback torque on both the rotor gearbox 22 and agitator gearbox 15. The recovered pitch may be a feedstock for further downstream processing. The pitch auger 16 may be supplemented with a pump (not illustrated) in some embodiments, or may be substituted with a pump in embodiments where a less viscous pitch is produced.

In one or more embodiments, the reactor vessel may have straight walls. In other embodiments, the reactor vessel may have tapered or inclined walls. As shown, this reactor vessel may have an angled taper to the walls forming a conical shape rather than cylindrical shape. The conical shape reduces the diameter of the reaction vessel from the top of the reactor to the bottom of the reactor. The straight wall vessel or the conical wall vessel may be selected in order to maintain a desired film thickness as liquid is converted to vapor within the reactor vessel.

Figure 2:
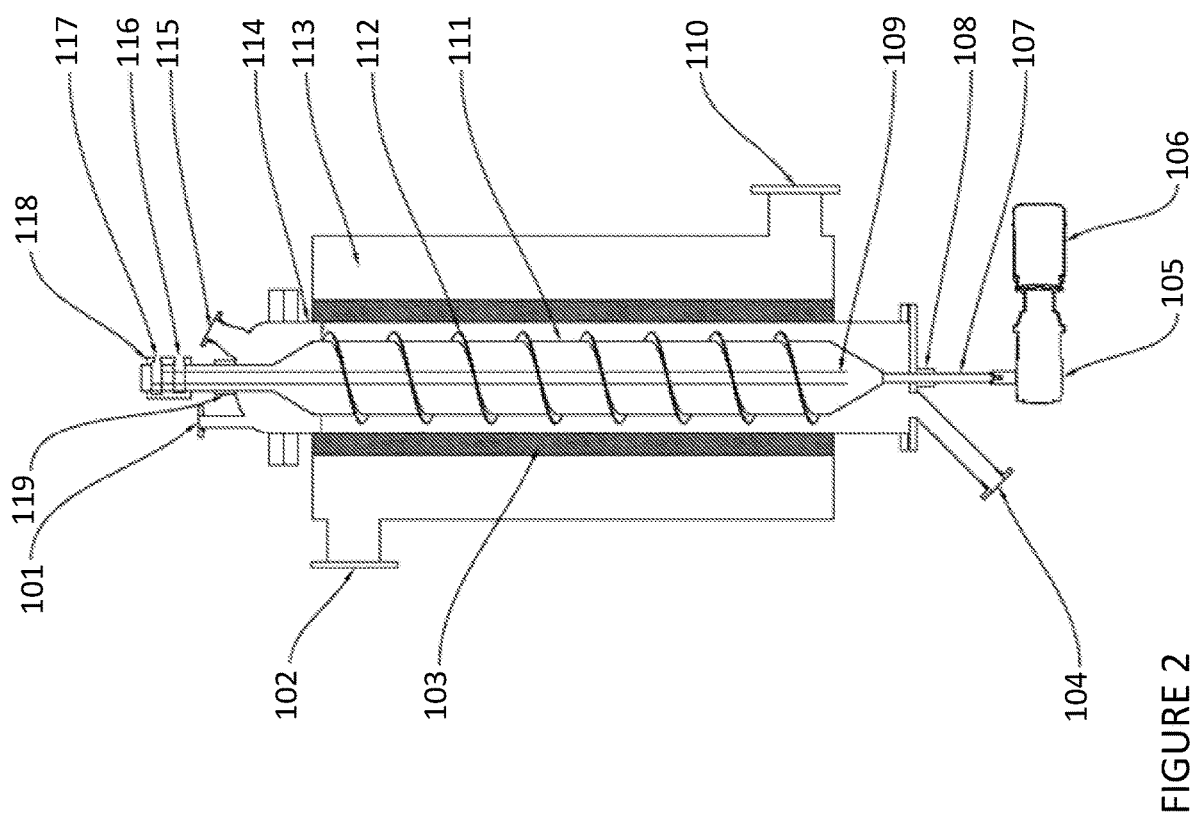
FIG. 2 illustrates a reactor design of a system according to one or more embodiments disclosed herein.

Moving now to FIG. 2, FIG. 2 illustrates a reactor design according to embodiments herein.

In the embodiments of FIG. 2, one or more feed inlet pipes 101 may introduced a molten plastic feed material through the overhead vapor space and deliver fresh molten plastic into the interior of an agitator drum 111. A molten plastic lift auger 112, as it rotates, will scrape molten plastic off the sides of the reactor shell 114 inner wall, resulting in molten plastic being mixed in the interior of the reactor vessel. This arrangement may allow for the constant removal of produced vapor from the system through reactor outlet 115. An upper shaft seal and bearing 119 may provide for both support of the auger 112 and prevent developed gas from escaping the reactor except through outlet 115.

The reactor shell 114 may be equipped with a heat conduction jacket 103 which is external to the vessel and attached to the outside of the reactor shell 114. This heat conduction jacket 103 may be in thermal contact with, and receive heat from, one or more hot gas jackets 113. The heat conduction jacket 103 spreads the heat out across the reactor shell 114. The flue gas jacket 113 may provide heat duty to the reactor by feeding a flue gas into a hot flue gas inlet 110 and removing the flue gas from a flue gas outlet 102. As the flue gas enters the hot flue gas inlet 110, the flue gas comes into contact with an outer surface of the reactor shell 114. The heat is then conducted to the heat conduction jacket 103, as described previously, to provide heat to the reactor vessel interior. In one or more embodiments, the amount of flue gas entering the flue gas jacket 113 may be controlled by opening or closing a valve (not illustrated). By controlling the amount of flue gas entering the flue gas jacket 113, the amount of heating within the reactor may be controlled.

As described, the agitator drum 111 may be equipped with an auger 112 that rotates about a center axis of the reactor. Augers are generally made up of an inclined plane wrapped helically around a center shaft or pipe. As the auger 112 rotates, material is dragged in the direction of the rotation, either due to friction if the material is traveling in a direction against gravity, or by the mechanical force of the included plane if the material is traversing in the opposite direction. As the auger 112 rotates, the auger 112 may provide mechanical scraping of the flowing material on the reactor shell 114 inner wall to prevent build-up of charred material on the reactor shell wall. In this way, the auger agitates the falling film, or liquid material, allowing the heat conduction jacket 103 to provide a consistent heating surface for melting the plastic material.

Additionally, a hot gas, which may be the same or different as the flue gas in the flue gas jacket 113, may be fed into the interior of the auger through a hot gas inlet 117 and to an auger interior inlet 109. This hot gas will traverse up the interior of the auger and exit the auger through hot gas outlet 116 on an agitator shaft slip ring 118. Because the auger may be a large piece of metal, there may be a tendency for the molten plastic to cool and solidify on the outer surface of the auger. By heating the interior of the auger, this cooling effect may be reduced or eliminated.

The bottom of the auger 112 may be connected to a drum shaft 107. The drum shaft 107 passes through a lower shaft seal and bearing 108 and is coupled to a gearbox 105. The drum shaft 107 receives a driving torque from the gearbox 105 which receives input from motor 106. The motor 106 may any known type of motor. In one or more embodiments, the motor may be a variable frequency drive motor which is capable of providing the necessary rotational speed torque, as well as torque feedback, for operation of the auger.

The motor 106, through rotor gearbox 105 and drum shaft 107, may also provide for a varied rotational speed, which may be controlled based on the amount of solid material fed to the reactor vessel, the type of material, the amount of char build-up on the interior wall, and the amount of heating required. Further, by varying the rotational speed and the geometry of the auger 112, the residence time the material in agitator drum 111 may be adjusted to achieve high conversion of material.

As is the case with the reactor of FIG. 1, the reactor vessel of FIG. 2 may be equipped with a pitch auger 104. The pitch auger 104 is configured to remove this pitch from the reactor by rotating and removing the solid material from the bottom portion of the bottom of the reactor. The speed at which the pitch auger 104 rotates will prescribe how much pitch is removed, and may be a function of the particular feedstock to the reactor vessel and the feedback torque on both the gearbox 105. The recovered pitch may be a feedstock for further downstream processing.

As noted above, the systems according to embodiments herein may be modular and provide for high throughput due to high heating rate in the raked film sections, facilitate continuous operation by converting molten plastic to a thin film on a heated surface, lower rates of char formation by reducing the skin temperature of the heated surface, flexibility to accept diverse types of mixed plastic waste by varying residence time and temperature, and continuous scraping/cleaning of the reactor interior wall thereby maintaining the heat transfer surface and avoid stopping of reactor for cleaning.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent of the United States is:

1. A system for converting waste plastic material to petrochemicals, the system comprising:
   a feed inlet and distributor section;
   a raked film reaction section located below the feed inlet and distributor section; and
   a stirred tank reaction section located below the raked film reaction section;
   wherein the feed inlet and distributor section comprises:
      one or more feed inlet pipes configured for receiving a waste plastic material feed stream comprising a molten plastic material;
      a distributor assembly configured for collecting the molten plastic material in a weir and distributing the molten plastic material onto an interior wall of the raked film reaction section; and
      a vapor outlet configured for collecting and removing a vapor effluent produced in the raked film reaction section.

2. The system of claim 1, wherein the system further comprises:
   one or more heating zones located around an outer surface of each of the raked film reaction section and the stirred tank reaction section, the one or more heating zones configured to provide heat to the raked film reaction section and the stirred tank reaction section;
   wherein each of the one or more heating zones comprise electrical heating elements, flue gas jackets, or a combination thereof.

3. The system of claim 1, wherein the raked film reaction section comprises:
   a rotor shaft located along a center axis of the raked film reaction section;
   one or more rake arms coupled to the rotor shaft;
   one or more rakes disposed on an end of the one or more rake arms;
   one or more heating zones located around an outer surface of the raked film reaction section, the one or more heating zones configured to provide heat to the raked film reaction section; and
   a heat conduction jacket containing a molten metal and located intermediate the one or more heating zones and the interior wall, the heat conduction jacket configured to evenly spread heat from the one or more heating zones along the interior wall of the raked film section,
   wherein the one or more rakes are configured to scrape the interior wall thereby mixing the molten plastic material flowing down the interior wall.

4. The system of claim 3, wherein the one or more rakes further comprise one or more springs, the one or more springs configured to keep the one or more rakes in contact with the interior wall.

5. The system of claim 3, wherein the one or more heating zones located around the outer surface of the raked film reaction section comprises a flue gas jacket, an electrical heating element, or a combination thereof.

6. The system of claim 3, wherein the stirred tank reaction section comprises:
an agitator located in an interior of the stirred tank reaction section configured for agitating a liquid effluent from the raked film reaction section;
one or more heating zones located around an outer surface of the stirred tank reaction section, the one or more heating zones configured to provide heat to the stirred tank reaction section, wherein the one or more heating zones around the outer surface of the stirred tank reaction section comprise a flue gas jacket, an electrical heating element, or a combination thereof;
a heating coil located in the interior of the stirred tank reaction section, the heating coil configured to independently heat the liquid effluent in the stirred tank reaction section separately from the one or more heating zones located around the outer surface of the stirred tank reaction section; and
a pitch auger configured for removing a pitch product produced in the stirred tank reaction section.

7. The system of claim 3, wherein the distributor assembly is coupled to the rotor shaft.

8. The system of claim 3, further comprising:
a rotor gearbox coupled to the rotor shaft, the rotor gearbox configured to supply a rotational torque to the rotor shaft; and
a rotor motor coupled to the rotor gearbox, the rotor motor configured to supply a rotational input to the rotor gearbox.

9. The system of claim 6, further comprising:
an agitator gearbox coupled to the agitator, the agitator gearbox configured to supply a rotational torque to the agitator; and
an agitator motor coupled to the agitator gearbox, the agitator motor configured to supply a rotational input to the agitator gearbox.

10. The system of claim 6, further comprising a rotor/agitator axial coupling configured for removably coupling the rotor shaft to the agitator, the system further comprising a top head body flange located on an external surface of the feed inlet and distributor zone, the top head body flange configured for enabling removal of the feed inlet and distributor zone and the raked film reaction section when the rotor/agitator axial coupling is uncoupled.

11. The system of claim 3, wherein an agitator is coupled to the rotor shaft, the system further comprising:
a gearbox coupled to the rotor shaft, the gearbox configured to supply a rotational torque to the rotor shaft and the agitator; and
a motor coupled to the gearbox, the motor configured to supply a rotational input to the gearbox.

12. The system of claim 2, wherein each of the one or more heating zones comprises a flue gas jacket, and wherein each of the flue gas jackets includes a hot flue gas inlet and a flue gas outlet, each of the flue gas inlets configured to receive a flue gas comprising a combustion product of a portion of the vapor effluent.

13. The system of claim 1, wherein the feed inlet and distributor section is insulated and does not comprise a heating jacket.

14. The system of claim 1, wherein the weir comprises notches, disposed along a top or perimeter edge of the weir.

15. The system of claim 1, wherein the weir is configured to retain a volume of the molten plastic material, and wherein the one or more feed inlet pipes are configured to introduce the waste plastic feed material below a top level of the molten plastic material.

16. The system of claim 1, wherein the distributor comprises an opening configured to direct the vapors effluent produced in the raked film reaction section into an overhead vapor space intermediate the distributor and the vapor outlet, without the vapor effluent contacting the molten plastic material retained in the distributor by the weir.

17. A system for converting waste plastic material to petrochemicals, the system comprising:
a feed inlet and distributor section; and
a stirred tank reaction section located below the feed inlet and distributor section;
wherein the feed inlet and distributor section comprises:
one or more feed inlet pipes configured for receiving a waste plastic material feed stream; and
a vapor outlet configured for collecting and removing a vapor effluent produced in the stirred tank reaction section;
wherein the stirred tank reaction section comprises:
a rotating auger located along a center axis of the stirred tank reaction section;
one or more heating elements located around an outer surface of the stirred tank reaction section, the one or more heating elements configured to provide heat to the stirred tank reaction section; and
a heat conduction jacket containing a molten metal and located intermediate the one or more heating elements and an interior wall, the heat conduction jacket configured to evenly spread the heat from the one or more heating zones along the interior wall,
wherein the rotating auger is configured to scrape the interior wall thereby mixing a molten plastic material flowing down the interior wall; and
wherein the rotating auger comprises an interior, the system further comprising an auger hot gas inlet and an auger gas outlet configured to respectively introduce and recover a hot gas provided to the interior of the rotating auger.

18. The system of claim 17, wherein the one or more heating elements located around the outer surface of the stirred tank reaction section comprises a flue gas jacket, an electrical heating element, or a combination thereof.

19. The system of claim 18, where each of the one or more heating zones comprises a flue gas jacket, and wherein each flue gas jacket includes a hot flue gas inlet and a flue gas outlet.

20. The system of claim 17, wherein the stirred tank reaction section further comprises:
a pitch outlet configured for removing a pitch product produced in the stirred tank reaction section.

21. The system of claim 17, further comprising:
a rotor gearbox coupled to the rotating auger, the rotor gearbox configured to supply a rotational torque to the rotating auger; and
a rotor motor coupled to the rotor gearbox, the rotor motor configured to supply a rotational input to the rotor gearbox.

* * * * *